Patented Mar. 25, 1930

1,752,121

UNITED STATES PATENT OFFICE

JOSEPH TCHERNIAC, OF STREATHAM HILL, LONDON, ENGLAND

MANUFACTURE OF ORTHO-ANISIDINE AND SIMILAR AMINOPHENOL ETHERS

No Drawing. Application filed September 29, 1927, Serial No. 222,940, and in Great Britain October 2, 1926.

This invention consists in the manufacture of ortho-aminophenol ethers by heating in a solution of an alkali, the product of reaction of an alkyloxyarylcarboxylic acid amide with a hypochlorite.

By the action of hypochlorite on methylsalicylamide, Pinnow and Müller (Berichte 1895, vol. 28, page 158) could detect only a faint smell of carbylamine, and failed to obtain any ortho-anisidine.

The reason of their failure appears to be that when methylsalicylamide is treated with alkali hypochlorite at ordinary temperature, there is first formed a mono-chloramide which remains in solution as an alkali salt:

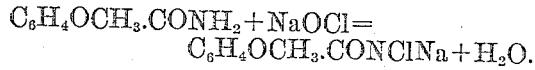

$C_6H_4OCH_3.CONH_2 + NaOCl =$
$\quad C_6H_4OCH_3.CONClNa + H_2O.$

If, however, the solution is heated, in the presence of caustic alkali, carbon dioxide is formed, and ortho-anisidine is produced:

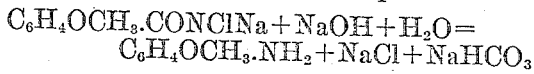

$C_6H_4OCH_3.CONClNa + NaOH + H_2O =$
$\quad C_6H_4OCH_3.NH_2 + NaCl + NaHCO_3$

The process of the invention is best conducted by treating the alkyloxyaryl-carboxylic acid amide with a solution of a hypochlorite containing a caustic alkali and heating the mixture. Preferably the amide is first dissolved in a solution of alkali hypochlorite, containing the necessary quantity of caustic alkali, and the whole heated. The ether is removed from the aqueous liquid and purified in known manner; or if volatile with steam it may be isolated in purified condition by distilling it from the aqueous liquid containing it.

The following example illustrates the invention:—

15.1 kilos of methylsalicylamide are stirred with 1500 litres of a solution of sodium hypochlorite containing 8.8 kilos of NaOCl and 4 kilos of caustic soda dissolved in 18 litres of water. The mixture is kept at about 20° C. for a few hours and then heated to boiling. The anisidine is steam distilled and goes over practically pure. The yield is over 80 per cent.

Having thus fully described the nature of the said invention and the best means I know of carrying the same into practical effect, I claim:—

1. A manufacture of ortho-aminophenol ethers by heating the product of the reaction of a hypochlorite and an alkali on an alkyloxyarylcarboxylic acid amide.

2. The manufacture of ortho-anisidine by dissolving methylsalicylamide in a solution of a hypochlorite and alkali and heating the solution.

In testimony whereof I have signed my name to this specification.

JOSEPH TCHERNIAC. [L. S.]